United States Patent
Couasnon

(10) Patent No.: US 6,347,834 B1
(45) Date of Patent: Feb. 19, 2002

(54) VEHICLE SEAT ASSEMBLY

(75) Inventor: Christian Couasnon, Troy, MI (US)

(73) Assignee: Bertrand Faure Components Ltd., Mississauga (CA)

( * ) Notice: Subject to any disclaimer, the term of this patent is extended or adjusted under 35 U.S.C. 154(b) by 0 days.

(21) Appl. No.: 09/645,322

(22) Filed: Aug. 25, 2000

Related U.S. Application Data

(60) Provisional application No. 60/164,746, filed on Nov. 12, 1999.

(51) Int. Cl.$^7$ .................................................. B60N 2/02
(52) U.S. Cl. .................. 297/341; 297/378.12; 297/318; 296/65.09; 296/66
(58) Field of Search ................................ 297/341, 318, 297/317, 378.12; 296/65.09, 65.16, 66

(56) References Cited

U.S. PATENT DOCUMENTS

| | | | | |
|---|---|---|---|---|
| 2,382,953 A | * | 8/1945 | Baxter | |
| 2,913,278 A | * | 11/1959 | Rosenberg | |
| 2,927,818 A | * | 3/1960 | Ferrara | |
| 4,152,024 A | * | 5/1979 | Farelli | 297/341 |
| 6,070,934 A | * | 6/2000 | Schhaefer et al. | 297/378.12 X |
| 6,099,072 A | * | 8/2000 | Sturt et al. | 297/341 X |
| 6,123,380 A | * | 9/2000 | Sturt et al. | 296/65.09 |
| 6,183,033 B1 | * | 2/2001 | Arai et al. | 296/65.09 |
| 6,196,613 B1 | * | 3/2001 | Arai | 296/65.13 |
| 6,199,951 B1 | * | 3/2001 | Zeile et al. | 297/341 |

FOREIGN PATENT DOCUMENTS

| | | | | |
|---|---|---|---|---|
| GB | 2 040 354 | * | 8/1980 | 297/341 |
| GB | 2155780 | * | 10/1985 | 297/341 |

* cited by examiner

Primary Examiner—Robert Canfield
(74) Attorney, Agent, or Firm—Patrick J. Hofbauer

(57) ABSTRACT

A vehicle seat assembly comprises a seat cushion member mountable on the floor and a seatback member having a loadable back surface and a lockable member mounted on the seatback member adjacent the lower extent thereof. The seatback member is movable between a generally upright occupiable configuration in which the loadable back surface is positioned in a generally rearwardly facing, vertical orientation and the lockable member is retained in closely held juxtaposed proximity to a rearward extent of the seat cushion member, and a substantially horizontal load supporting configuration in which the loadable back surface is positioned in a generally horizontal, upwardly facing relation and the lockable member is rearwardly displaced from the closely held juxtaposed proximity. A lock is mounted on the seat cushion member and adapted to be selectively movable between a locked configuration whereat the lockable member is retained by the lock in the closely held juxtaposed proximity, and an unlocked configuration wherein the lockable member is released by the lock from the closely held juxtaposed proximity. A link member is interconnected between the seatback member and the seat cushion member for controlling movement of the seatback member relative to the seat cushion member between the generally upright occupiable configuration and the substantially horizontal load supporting configuration. Rollers are mounted on the seatback member adjacent the lower extent for supporting the seatback member in rolling relation as it moves between the generally upright occupiable configuration and the substantially horizontal load supporting position.

22 Claims, 9 Drawing Sheets

VEHICLE SEAT ASSEMBLY

This application claims benefit to U.S. provisional application Ser. No. 60/164,746, filed Nov. 12, 1999.

FIELD OF THE INVENTION

The present invention relates to vehicle seats that fold flat to a substantially horizontal load supporting position and more particularly to such vehicle seats that provide a maximized cargo area having a large substantially flat area for supporting cargo thereon when in their substantially horizontal load supporting position.

BACKGROUND OF THE INVENTION

Multi-seat vehicles, such as vans, minivans, sport utility vehicles, and the like, typically have middle (second row) and rear (third row) vehicles seats that are placed rearwardly of the driver's and front passenger's (first row) vehicle seats. The second and third row seats are typically selectively removable and replaceable through a large rear or side door in order to ready the vehicle for carrying cargo. Removal and replacement of these vehicle seats tends to be somewhat difficult and requires a considerable amount of effort on the part of the user, especially with respect to the middle vehicle seat.

To overcome this problem, many second and third row seats, and even some first row passenger seats, are configurable from an upright occupiable configuration to a substantially horizontal load supporting position, whereat the back surface of the seatback member presents a load supporting surface. Typically, such seatback members are pivotally mounted on the seat cushion members and are forwardly foldable over the seat cushion member by means of simple pivotal movement of the seatback member. There are various significant problems presented by such prior art vehicle seats.

Firstly, the back surfaces of the second row and third row seats, when in the forwardly folded position, are not large enough to cover any more than about half of the cargo area of the vehicle. Thus, such seats present no large substantially flat overall platform for supporting cargo thereon.

Another problem with such vehicle seats in their substantially horizontal load supporting position is that there tends to be a gap between longitudinally adjacent seats, or in other words between the first row and second row seats, and between the second row and third row seats. Such gaps tends to permit objects to fall between longitudinally adjacent seats or become caught between them during, for example, loading. Accordingly, the existence of such gaps is highly undesirable.

Also, in a vehicle having vehicle seats wherein the seatback member merely pivots over the seat cushion member to a forwardly folded position, the back surface of the folded seatback is disposed at a substantial distance above the floor of the vehicle. Accordingly, the vertical distance between the top surface of the forwardly folded seatbacks and the roof of the vehicle is not maximized, thus significantly reducing the available cargo storage space between the back surface of the folded vehicle seats and the roof of the vehicle. In order to try to maximize this cargo storage space, more recent minivans have second row and third row seats that fold to a relatively low profile load supporting configuration adjacent the vehicle floor. One such vehicle seat can be seen in U.S. Pat. No. 6,012,755, issued Jan. 11, 2000, to Hecht et al, for a Foldable Automotive Seat, and another such vehicle seat can be found in U.S. Pat. No. 5,588,707, issued Dec. 31, 1996 to Bolsworth et al, for a Folding Seat. In each of these vehicle seats, the legs of the vehicle seat are pivotally attached to the seat cushion and pivotally attached to the floor of the vehicle. Such pivotal attachment allows the seat cushion to be moved to a lowered position adjacent to the vehicle floor. However, in both of these prior art seat assemblies, the seatback merely folds forwardly about a pivot axis over the seat cushion, such that the back surfaces of the respective seatbacks of such vehicle seat assemblies are necessarily disposed at a height above the level of the top of the seat cushion. While this type of arrangement represents an increase in the amount of cargo space available between the top surface of the forwardly folded seatbacks and the roof of the vehicle over the prior art, further maximization of such cargo carrying capacity is desirable.

Other prior art attempts at trying to maximize cargo space are disclosed in U.S. Pat. No. 5,890,758, issued Apr. 6, 1999 to Pone et al; and U.S. Pat. No. 5,979,964, issued Nov. 9, 1999 to Ban et al; wherein second row or third row vehicle seats are manually movable from their upright occupiable configuration to a stored position within a recess in the vehicle floor. A separate cover is placed over the recess to present a substantially flat platform for receiving cargo thereon, which separate cover is expensive to manufacture and requires extra time and effort to move into and out of place. Further, a specially formed vehicle floor is required, which is costly and presents undesirable design constraints.

Another problem associated with vehicle seats that are designed to move from an upright occupiable configuration to a substantially horizontal load supporting position, which vehicle seats are designed to maximize cargo space, is that a plurality of manual manipulations or movements are required to move the vehicle seats from their upright occupiable configuration to their substantially horizontal load supporting position, which is extremely inconvenient. Further, the control mechanisms that must be manipulated so as to permit and/or cause such movement of the vehicle seat are unduly complicated, and in many cases, more than one such control mechanism is required.

Another significant problem encountered during the forward folding of a seatback member over the seat cushion member is that of interference between the headrest of the seatback member being forwardly folded with a part of the vehicle's interior disposed immediately in front of it. For instance, a front passenger seat headrest might hit the dashboard upon forward folding of its seatback and the headrest of a second row seat, or a third row seat, might hit the rear of the seatback disposed immediately in front of it during such forward folding. Such interference precludes the seatback member from forthwith reaching its fully forwardly folded position, which is unacceptable. Thus, in the prior art, in order to permit the seatback member to reach its fully forwardly folded position upon encountering such interference, it is necessary for the user to manually manipulate the various latching mechanisms of the seat assembly being folded, and manually move the seat assembly rearwardly to a longitudinal position whereat the headrest of the seatback member clears the dashboard or seatback immediately in front of it. Such additional manual manipulation is inconvenient, time-consuming, and unnecessary. Additionally, a person may forget to move, or even forego moving, the vehicle seat assembly to a longitudinal position whereat it clears the object in front of it, thus potentially resulting in damage to either the headrest of the seatback being folded, or to the object it impacts.

It is therefore an object of the present invention to provide a vehicle seat that moves from an upright occupiable configuration to a substantially horizontal load supporting position, wherein a large substantially flat platform that covers a significant portion of the cargo area, is presented.

It is another object of the present invention to provide a vehicle seat that moves from an upright occupiable configuration to a substantially horizontal load supporting position, wherein any gap between longitudinally adjacent seats is minimized, or rendered substantially nonexistent.

It is another object of the present invention to provide a vehicle seat that moves from an upright occupiable configuration to a substantially horizontal load supporting position, wherein the vertical distance between the top surface of the forwardly folded seatbacks and the roof of the vehicle is maximized, thus maximizing cargo storage space.

It is yet another object of the present invention to provide a vehicle seat that moves from an upright occupiable configuration to a substantially horizontal load supporting position, which vehicle seat does not require a specially formed seatback or an extra panel to present a substantially flat platform for receiving cargo thereon.

It is a further object of the present invention to provide a vehicle seat that moves from an upright occupiable configuration to a substantially horizontal load supporting position, which vehicle seat does not require a specially designed vehicle floor.

It is a further object of the present invention to provide a vehicle seat that moves from an upright occupiable configuration to a substantially horizontal load supporting position through manual manipulation of a single seatback control means, such as a seatback latch.

It is yet a further object of the present invention to provide a vehicle seatback that preadjusts to its longitudinal position within the vehicle relative to the seat cushion member so that the seatback member (or its headrest), does not hit that part of the vehicle's interior disposed immediately in front of it when the seatback member is being forwardly folded from an upright occupiable configuration to a substantially horizontal load supporting position.

It is still a further object of the present invention to provide a vehicle seat that moves from an upright occupiable configuration to a substantially horizontal load supporting position, which vehicle seat is simple and inexpensive to manufacture.

It is yet a further object of the present invention to provide a vehicle seat that moves from an upright occupiable configuration to a substantially horizontal load supporting position, wherein the back surface of the seatback assumes a level at or below the top surface of the seat cushion member without the need for floor recesses and the like.

SUMMARY OF THE INVENTION

In accordance with the present invention there is disclosed a vehicle seat assembly for installation on a floor of a vehicle having a longitudinal axis, the floor having a stop means positioned behind the seat assembly when so installed. The seat assembly comprises a seat cushion member mountable on the floor; and a seatback member having inboard and outboard sides, a loadable back surface extending between a lower extent and an upper extent, and at least one lockable member mounted on the seatback member adjacent the lower extent thereof. The seatback member is movable between a generally upright occupiable configuration in which the loadable back surface is positioned in a generally rearwardly facing, vertical orientation and the at least one lockable member is retained in closely held juxtaposed proximity to a rearward extent of the seat cushion member, and a substantially horizontal load supporting configuration in which the loadable back surface is positioned in a generally horizontal, upwardly facing relation and the at least one lockable member is rearwardly displaced from the closely held juxtaposed proximity. A locking means is operatively mounted on the seat cushion member and adapted to be selectively movable between a locked configuration whereat the at least one lockable member is retained by the locking means in the closely held juxtaposed proximity, and an unlocked configuration wherein the at least one lockable member is released by the locking means from the closely held juxtaposed proximity. A link means is operatively interconnected between the seatback member and the seat cushion member for controlling movement of the seatback member relative to the seat cushion member between the generally upright occupiable configuration and the substantially horizontal load supporting configuration when the locking means is in the unlocked configuration. A roller means is operatively mounted on the seatback member adjacent the lower extent for supporting the seatback member in rolling relation as it moves between the generally upright occupiable configuration and the substantially horizontal load supporting position.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

The novel features which are believed to be characteristic of the vehicle seat assembly according to the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 1A:
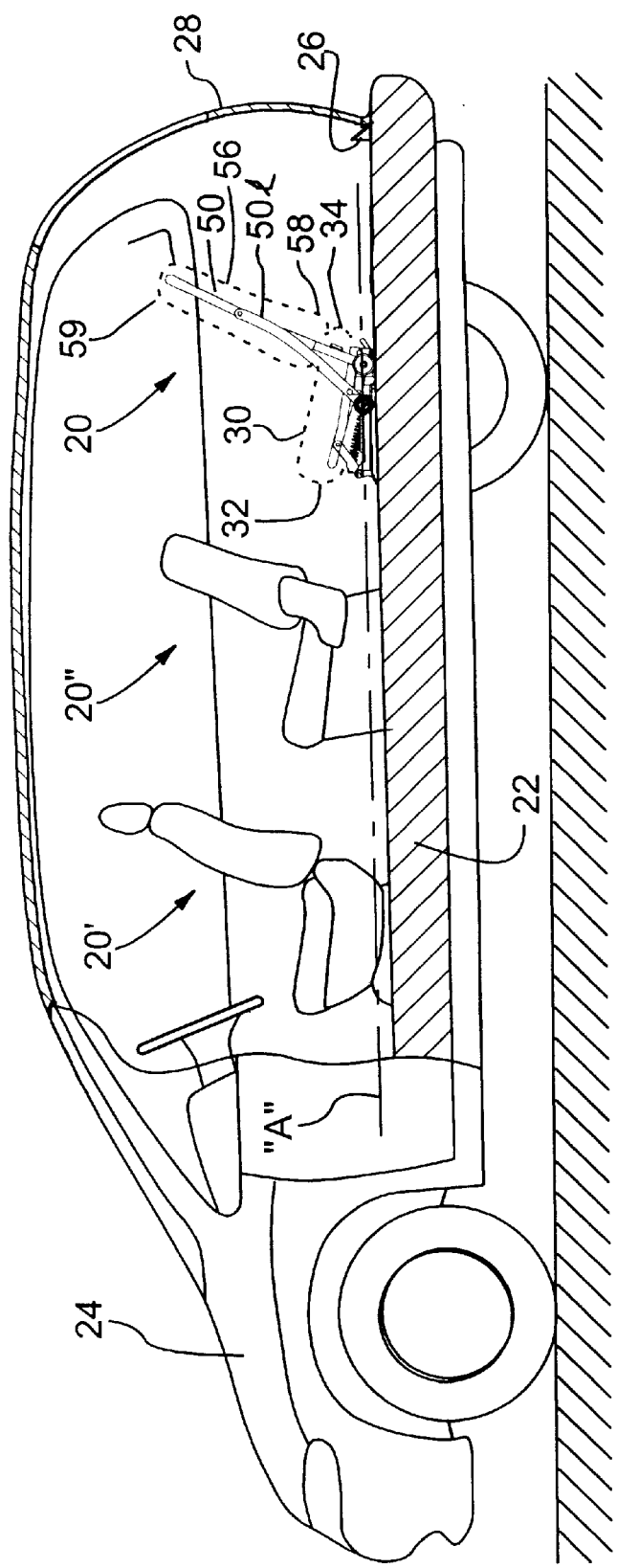
FIG. 1A is a side elevational view of a preferred embodiment vehicle seat assembly according to the present invention, installed in a vehicle as the passenger seat in the third row position, and in an upright occupiable configuration with the cushion material shown in phantom and with a rear portion of the vehicle longitudinally sectioned for the sake of clarity.

Reference will now be made to FIGS. 1A through 8 of the drawings, which show a vehicle seat assembly, as indicated by the general reference numeral 20, according to the present invention. The fold flat vehicle seat 20 has a left side, as indicated by the general reference numeral 20l in FIG. 2, and an right side, as indicated by the general reference numeral 20r in FIG. 2, and is for installation on a floor 22 of a vehicle 24 having a generally centrally disposed longitudinal axis "A". As can be best seen in FIGS. 1A and 1B, the vehicle seat assembly 20 may be installed in the vehicle 24 as, for example, a third row seat, as specifically illustrated in FIGS. 1A and 1B. It will be apparent to those skilled in the art that the vehicle seat assembly 20 could be readily adapted, with little or no significant modification, to be utilized in a vehicle 24 as a first row seat 20', or as a second row seat 20", while exhibiting the same degree of utility exhibited in its illustrated positioning as a third row seat 20. However, for the purposes of simplicity, the vehicle seat assembly 20 of the preferred embodiment described and illustrated herein will be described in the context of its positioning within the vehicle as a third row vehicle seat assembly 20. Irrespective of its row position within the vehicle 24, the vehicle seat assembly 20 is installable in a vehicle 24, such as the minivan type vehicle shown in FIGS. 1A and 1B, so as to be either permanently installed within the vehicle 24, or installed in a readily removable and replaceable relation within the vehicle 24, both of which modes of installation are well-known in the automotive arts. For ease of illustration, the preferred embodiment 20, is shown in the form of a permanent installation.

Further, the particular vehicle seat assembly 20 shown is illustrated as a bench type (multi-occupant) seat assembly. Equivalently, the vehicle seat assembly 20 could be of a bucket (single occupant) seat design, for installation on either on the driver's side, or the passenger's side of the vehicle 24. Such minor moving of components and changes in dimension so as to particularly suit the seat assembly for different applications are a matter of routine design choice, within the ordinary skill of persons versed in the art.

As can also be seen in FIGS. 1A, 1B, and 4 through 8, the floor 22 of the vehicle 24 has a stop means 26 positioned behind the vehicle seat assembly 20 when the vehicle seat assembly is so installed. The stop means 26 preferably comprises a pair of opposed stop members 26 mounted one on each of the left and right sides of the vehicle 24. Alternatively, the stop means could comprise a laterally extending ridge that is parallel to the rear hatch 28 of the vehicle 24, or could comprise the vertical upright portions of the rear of the vehicle 24 adjacent the rear hatch 28. In some vehicles, especially sport utility vehicles, the stop means could comprise a step in the floor of the vehicle.

As can be best seen in FIGS. 2 through 8, the vehicle seat assembly 20 comprises a seat cushion member 30 mountable on the floor 22 of the vehicle 24. The vehicle seat assembly 20 is substantially symmetrical about the generally centrally disposed longitudinal axis "A" and is mounted on the floor of the vehicle 24 by means of left and right mounting assemblies, as indicated by the general reference numerals 21l,21r, respectively. The left 21l and right 21r mounting assemblies are generally mirror images one of the other, and accordingly, the following discussion of the left 21l and right 21r mounting assemblies applies to both the left 21l and right 21r assemblies, except as otherwise noted. For the sake of convenience, like reference numerals have been used for both the left 21l and right 21r mounting assemblies.

The seat cushion member 30 comprises an internal tubular structural member 31 and two movable track members 40. The movable track members 40 are pivotally affixed to the seat cushion 30 adjacent the rear extent 34 of the seat cushion member 30, by means of seat cushion mounting brackets 41 that are secured each one to the top span 40t of the respective movable track member 40 by conventional means such as welding or by threaded fasteners, as is well known in the art. The seat cushion member 30 is itself secured in pivotal relation to the seat cushion mounting brackets 41 by stake pins 41s, for pivotal movement of the seat cushion member 30 about a laterally disposed substantially horizontal seat cushion pivot axis "P", as indicated by arrow "B" in FIG. 3A. Such pivotal affixation thereby permits the upward and downward movement of the forward extent 32 of the seat cushion member 30, as will be discussed in greater detail subsequently.

Figure 3A:
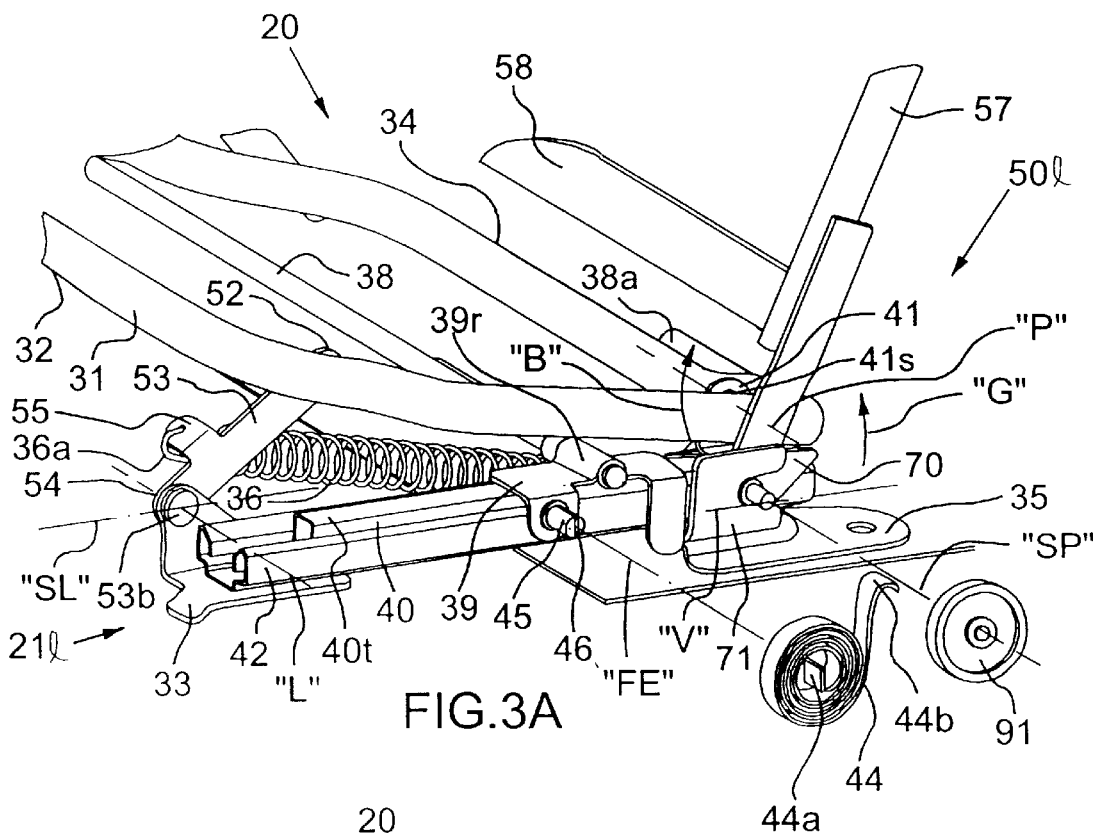
FIG. 3A is a partially exploded perspective view, on an enlarged scale, from the front left of a portion of the preferred embodiment vehicle seat assembly illustrated in FIG. 2, with a link arm member removed for the sake of clarity.
Figure 3B:
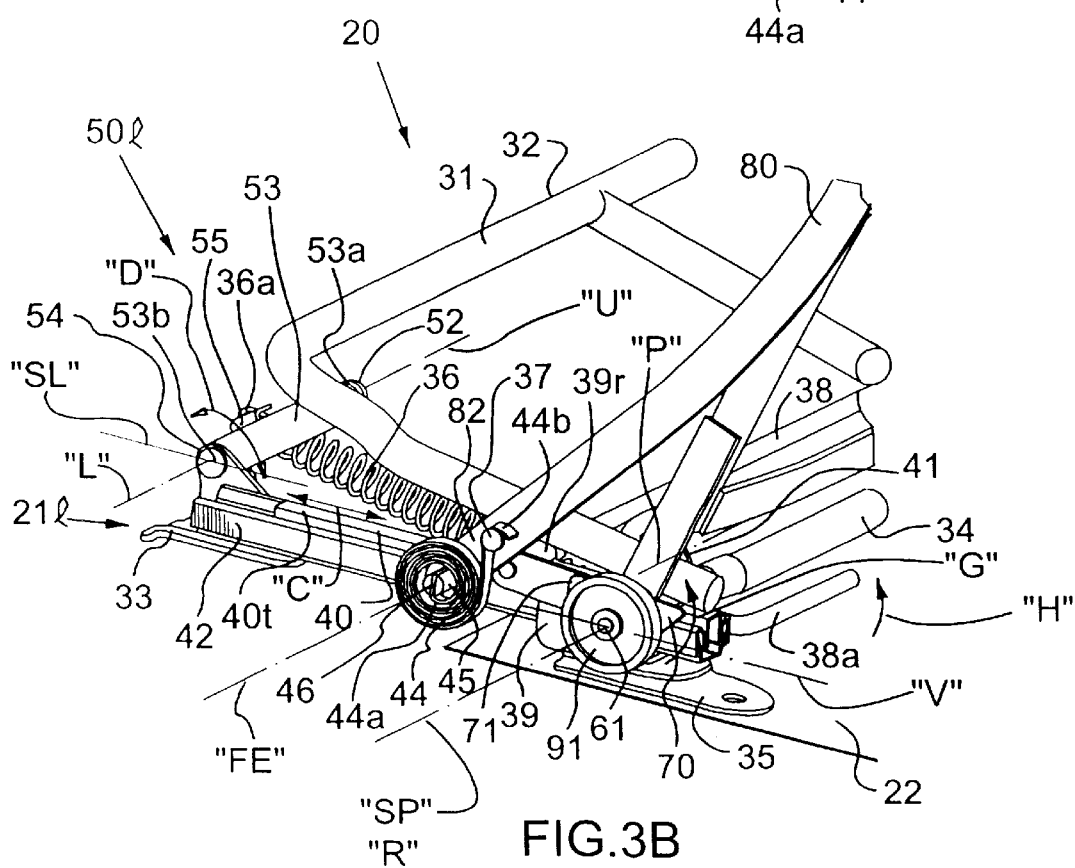
FIG. 3B is an enlarged perspective view from the rear left of the portion of the preferred embodiment vehicle seat assembly illustrated in FIG. 3A, but with the parts exploded in FIG. 3A in place on the vehicle seat assembly.

The seat cushion member 30 is mountable on the floor 22 of the vehicle 24 for longitudinal movement with respect to the floor 22 of the vehicle 24 by means of the movable track member 40 slideably engaging fixed track member 42, as indicated by double-ended arrow "C" in FIG. 3B. The fixed track member 42 is rigidly mounted on the floor 22 of the vehicle 24, as can be best seen in FIGS. 3A and 3B, by means of two "L"-shaped front brackets 33 and two "L"-shaped rear brackets 35. Each of the front 33 and rear 35 mounting brackets is, in turn, conventionally secured to the floor 22 of the vehicle 24 by conventional means such as welding or by threaded fasteners, as is well known in the art. The movable track member 40 is conventionally disposed in supported relation on the fixed track member 42 so as to present a substantially horizontal top span 40t. In this manner, the seat cushion member 30 is mountable for movement of the seat cushion member 30 from an initial rearward position, as can be best seen in FIGS. 3A through 6, to a forward position of the seat cushion member 30, as can be best seen in FIG. 8.

The seat cushion member 30 is also mountable of the floor 22 of the vehicle 24 by means of two leg members 53. Each of the leg members 53 is pivotally connected at a lower leg end 54 to the front mounting bracket 33 by a stake pin 53b, for pivotal movement about a lower fixed pivot axis "L", such pivotal movement being indicated by double ended arrow "D" in FIG. 3B, and pivotally connected at an opposite more upper leg end 52 to the seat cushion 30 adjacent a forward extent 32 of the seat cushion 30 by means of a stake pin 53a, for pivotal movement about an upper movable pivot axis "U". As can be best seen in FIGS. 2 through 6, the initial rearward position of the seat cushion member 30 is a raised initial rearward position and, as can be best seen in FIG. 8, the forward position of the seat cushion member 30 is a lowered forward position. As can be best seen in FIGS. 2, 3A, 3b, and 4, the upper moveable pivot axis "U" is disposed rearwardly of the lower fixed pivot axis "L" when the seat cushion member 30 is in its raised initial rearward position. As can best be seen in FIG. 8, the upper moveable pivot axis "U" is disposed forwardly of the lower fixed pivot axis when the seat cushion member 30 is in its lowered forward position. Further, as can best be seen in FIGS. 6 through 8, with this arrangement, the forward extent 32 of the seat cushion member 30 is caused to move upwardly and then downwardly in an arcuate path "AP", as shown in FIG. 7, when the seatback member moves from its raised initial rearward position (as shown on FIG. 5) to its lowered forward position (as shown in FIG. 8).

A first spring means 36 is operatively interconnected between the leg members 53 and the floor 22 of the vehicle 24. More specifically, the first spring means 36 comprises a tensioned coil spring 36 connected at a first end 36a to a transverse tab 55 disposed on the leg member 53 and connected at a second end 36b to the lateral tab 351 on the rear mounting bracket 35. When the upper movable pivot axis "U" is disposed above a straight line "SL" passing through the lower fixed pivot axis "L" and parallel to the line of action of the tensioned coil spring 36, the seat cushion member 30 is biased to its initial position by the tensioned coil spring 36. Further, when the upper movable pivot axis "U" is disposed below a "SL" passing through the lower fixed pivot axis "L" and parallel to the line of action of the tensioned coil spring 36, the seat cushion member 30 is biased to its lowered forward position by the tensioned coil spring 36.

The vehicle seat assembly 20 also comprises a seatback member 50 having a left side 50l (the driver's side) and a outboard right side 50r (the front passenger's side), an internal tubular structural member 57. A loadable back surface 56 extends between a lower extent 58 and an upper extent 59 of the seatback member 50.

Figure 1B:
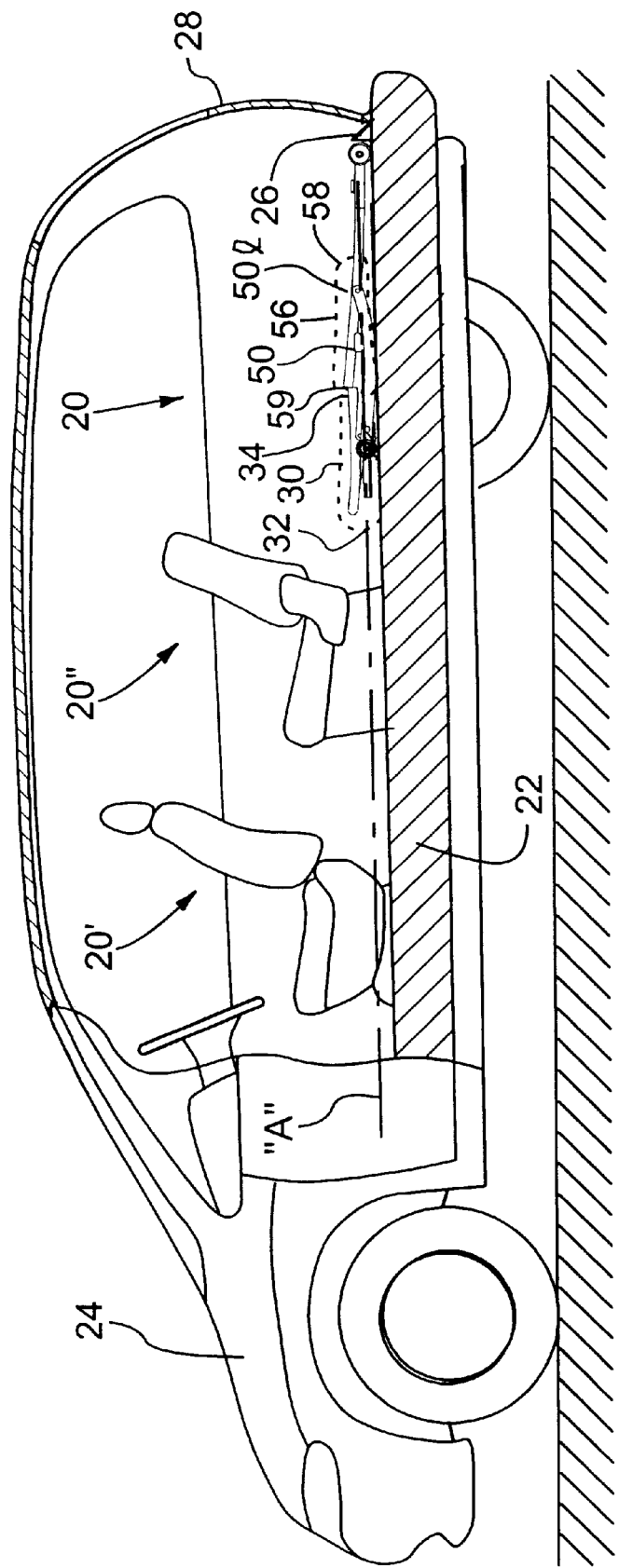
FIG. 1B is a perspective view similar to FIG. 1A, but with the vehicle seat assembly in a substantially horizontal load supporting configuration.
Figure 2:
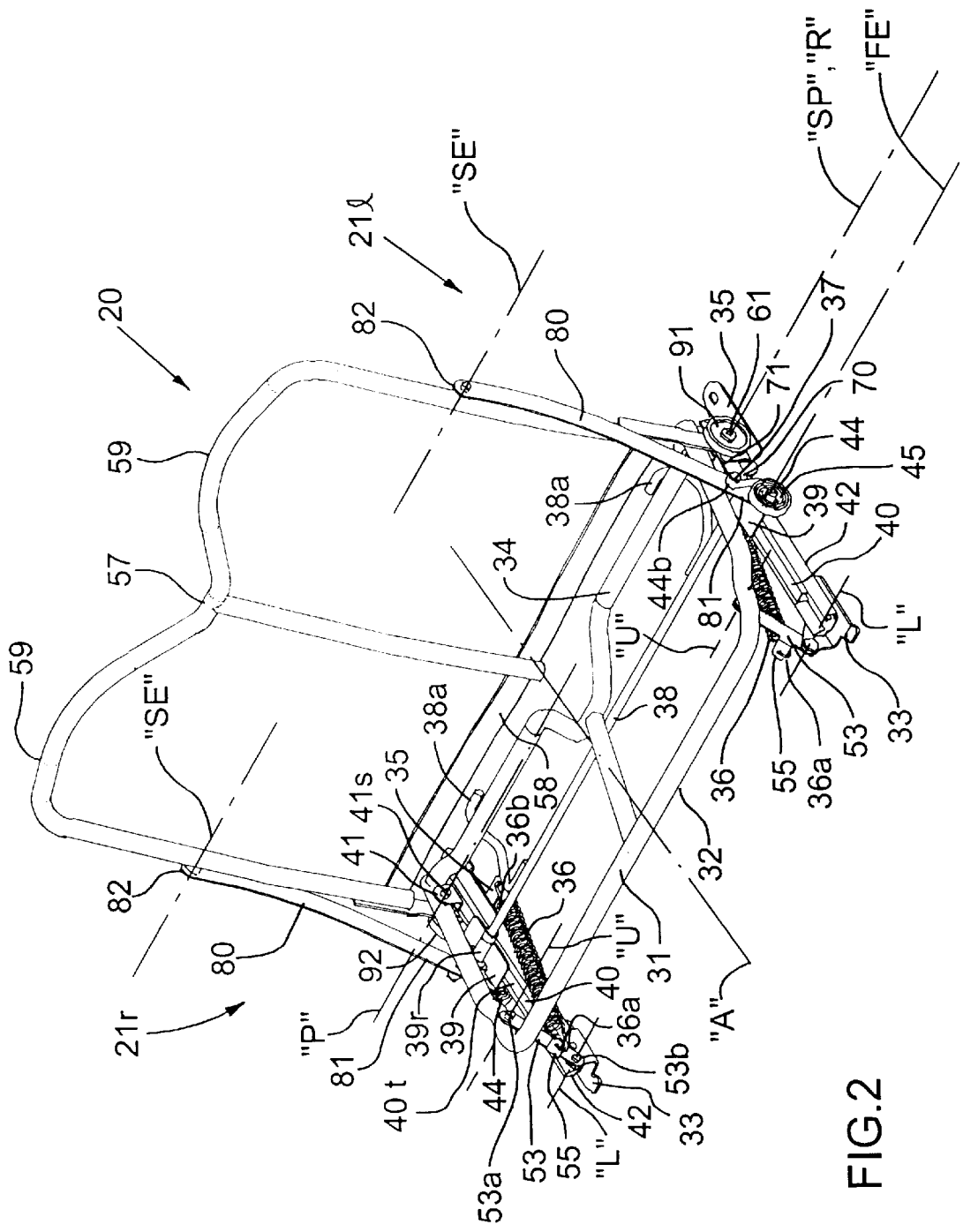
FIG. 2 is a perspective view from the front left of the preferred embodiment vehicle seat assembly illustrated in FIG. 1, with the seatback member in a substantially upright occupiable configuration, and showing the frame portions and working mechanisms of the vehicle seat assembly with the fabric and foam cushioning removed for ease of illustration.
Figure 7:
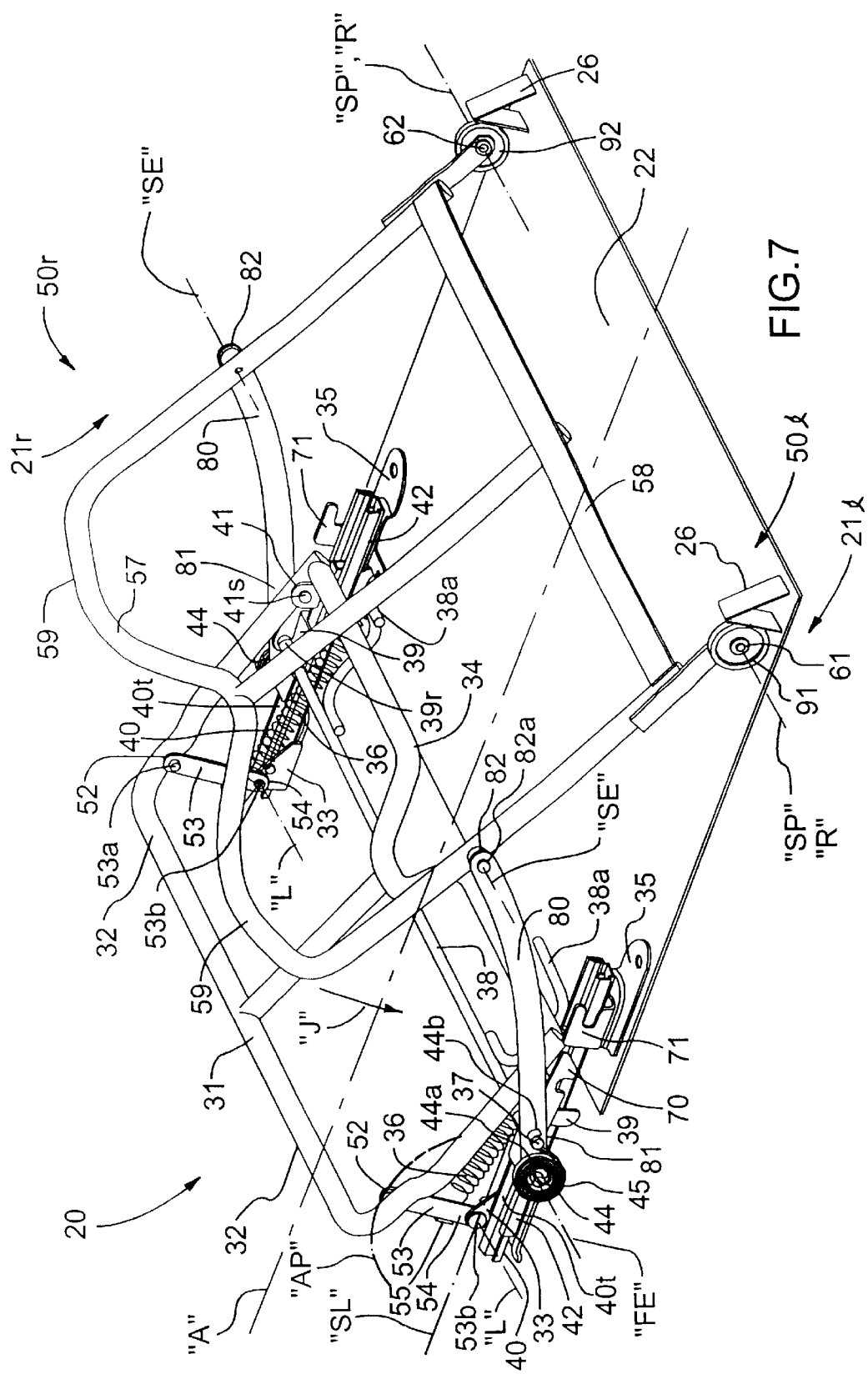
FIG. 7 is a perspective view similar to FIG. 6, with the upper extent of the seatback member still continuing to move forwardly and downwardly, and having pushed the seat cushion member forwardly of its initial rearward position; and, FIG. 8 is a perspective view similar to FIG. 7, with the seatback member disposed in its substantially horizontal load supporting configuration and with the seat cushion member disposed in its lowered forward position.
Figure 8:
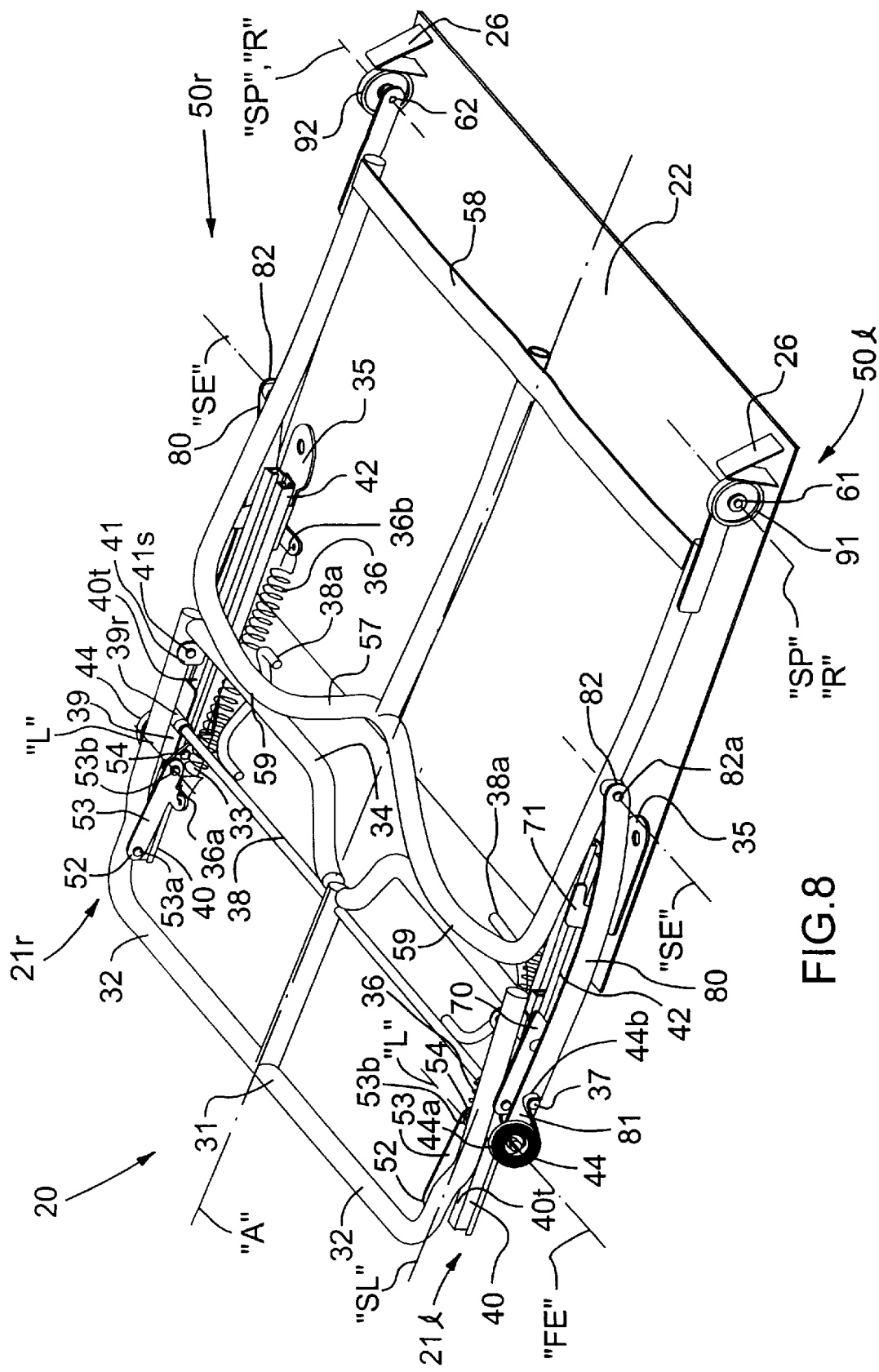

The seatback member 50 is movable between a generally upright occupiable configuration, as can be best seen in FIGS. 1A, 2, 3A, 3B, and 4, and a substantially horizontal load supporting configuration, as can be best seen in FIGS. 1B and 8. In the generally upright occupiable configuration of the seatback member 50, the loadable back strip 56 is positioned in a generally rearwardly facing, vertical orientation. It can be readily seen that this configuration is the configuration used for an occupant to sit in the vehicle seat 24. In the substantially horizontal load supporting configuration, the loadable back surface 56 is positioned in generally horizontal, upwardly facing relation, so as to be ready to receive cargo and the like thereon. As can be best seen in FIGS. 5, 6 and 7, when the seatback member moves from its generally upright occupiable position to its substantially horizontally load supporting position, the seatback member 30 folds forwardly such that the upper extent 59 of the seatback member 50 moves forwardly and downwardly, as indicated by arrow "E" in FIG. 6, and the lower extent 58 of the seatback member 50 moves generally rearwardly, as indicated by arrow "F" in FIGS. 5 and 6.

At least one lockable member preferably comprises at least one axle shaft, and in the preferred embodiment as illustrated comprises a first axle shaft 61 and a second axle shaft 62. The first axle shaft 61 and a second axle shaft 62 are mounted on the seatback member 50 adjacent the lower extent 58 thereof in laterally extending relation. The first axle shaft 61 is disposed on the left side 50l (the driver's side) of the vehicle 24 and the second axle shaft 62 is disposed on the right side 50r (the passenger's side) of the vehicle 24. When the seatback member 50 is in its generally upright occupiable configuration, the first 61 and second 62 axle shafts are retained in closely held juxtaposed proximity to a rearward extent 34 of the seat cushion member 30, as will be discussed in greater detail subsequently.

A locking means 70 is operatively mounted on the seat cushion member 30 at the movable track member 40. In the preferred embodiment as illustrated, as can be seen in FIGS. 2 through 8, and as can be best seen in FIG. 3B, the locking means comprises a pivotally mounted latch member 70 and a co-operating base bracket 71 that is securely captured between the fixed track member 42 and the rear mounting bracket 35. The pivotally mounted latch member 70 is securely mounted on the end of a slave rod 38 for concurrent pivotal movement therewith. The slave rod 38 is retained in pivotal relation by a retaining bracket 39, within an upwardly extending downwardly open receptacle portion 39r of the retaining bracket 39, as can be best seen in FIG. 3A. The retaining bracket 39 is secured to the top span 40t of the movable track member 40 by conventional means such as welding or by threaded fasteners, as is well known in the art. Two curve-shaped track release handles 38a are welded to the slave rod 38 so as to extend rearwardly therefrom.

Figure 4:
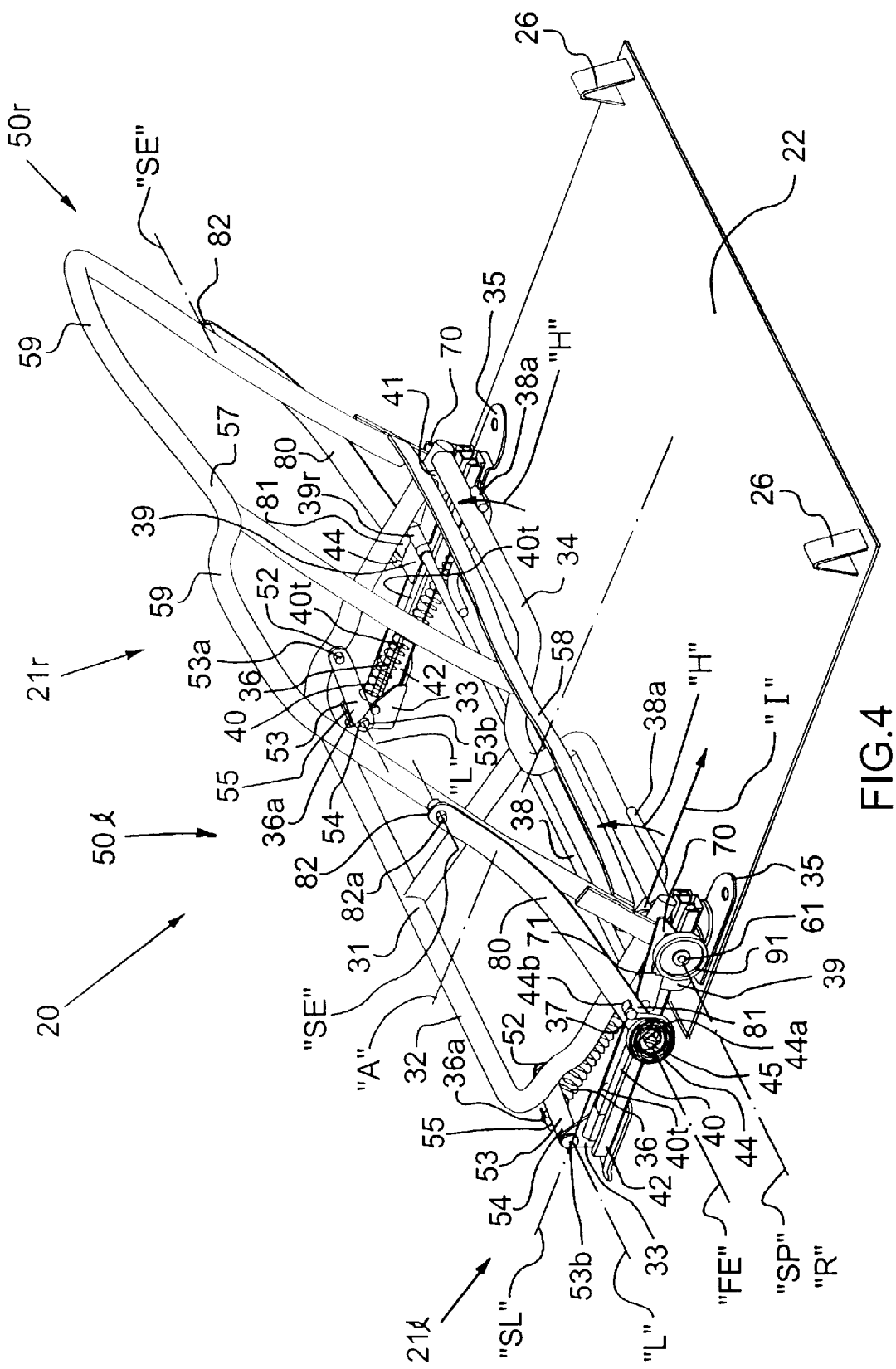
FIG. 4 is a perspective view from the rear left of the preferred embodiment vehicle seat assembly illustrated in FIG. 2.

The pivotally mounted latch member 70 is selectively movable, as indicated by arrow "G" in each of FIGS. 3A and 3B, between a locked configuration, as seen in FIG. 3B, and an unlocked configuration, as seen in FIG. 4, by means of upward manual manipulation of either of the two track release handles 38a, as indicated by arrow "H" in FIG. 3B. In the locked configuration, which occurs when the seatback member 50 is in its generally upright occupiable configuration, the first axle shaft 61 and the second axle shaft 62 are retained by the pivotally mounted latch member 70 in said closely held juxtaposed proximity to the rearward extend 34 of the seat cushion member 30. In the unlocked configuration, the first axle shaft 61 and the second axle shaft 62 are released by the pivotally latch member 70 from said closely held juxtaposed proximity to the rearward extent 34 of the seat cushion member 30, and are rearwardly displaced from aforesaid closely held juxtaposed proximity to the rearward extend 34 of the seat cushion member 30, as can be best seen in FIGS. 1B and 8.

Roller means comprising at least one roller member, and in the preferred embodiment as illustrated, comprising a first roller member 91 and a second roller member 92 are operatively mounted on the seatback member 50 adjacent the lower extent 58 thereof. More particularly, the first roller member 91 is freely rotatably mounted on the first axle shaft 61 and the second roller member 92 is freely rotatably mounted on the second axle shaft 62, for rotation about an axis of rotation "R" and for operative rolling contact of the first 91 and second 92 roller members with the floor 22 of the vehicle 24. Accordingly, the first 91 and second 92 roller members are for supporting the seatback member 50 when the seatback member 50 is in its generally upright occupiable configuration, and for supporting the seatback member 50 in rolling relation as it moves between its generally upright occupiable position, as is best seen in FIGS. 1A, 2, 3A, 3B, and 4, and its substantially horizontal load supporting position, as can be best seen in FIGS. 1A and 8. It can therefore be seen that the seatback member 50 folds forwardly about a seatback pivot axis "SP" that is common with the axis of rotation "R" of the roller means 90. Therefore, the first 91 and second 92 roller members are freely rotatably mounted on a respective one of the first 61 and second 62 axle shafts, for rotation about the seatback pivot axis "SP". The first 91 and second 92 roller members also support the seatback member 50 when the seatback member 50 is in its substantially horizontal load supporting configuration.

A link means 80 is operatively interconnected between the seatback member 50 and the seat cushion member 30. In the preferred embodiment as illustrated, the link means comprises a substantially rigid link arm member 80 pivotally mounted adjacent a first end 81 thereof to the seat cushion member 30. More specifically, the substantially rigid link arm member 80 is pivotally connected at its first end 81 onto a horizontally disposed post 45 that extends outwardly from the retaining bracket 39 secured to the movable track member 40, for rotation about a first end pivot axis "FE". In this manner, any forces transmitted from the seatback member 50 to the substantially rigid link arm member 80 are borne by the movable track member 40.

The substantially rigid link arm member 80 is pivotally mounted adjacent an opposite second end 82 thereof by stake pins 82a to the seatback member 50 for rotation about a second end pivot axis "SE" at a position spaced above the vertical level "V" of the first axle shaft 61 and the second axle shaft 62. In the preferred embodiment as illustrated, the second end 82 of the substantially rigid link arm member 80 is pivotally mounted to the seatback member 50 in a vertically central region of the seatback member 30, for reasons of geometry that will become apparent subsequently. In the generally upright occupiable configuration of the seatback member 50, the seatback pivot axis "SP" is disposed forwardly of the second end pivot axis "SE".

A second spring means comprising a clock spring 44 is engaged at its inner end 44a within a slot 46 in the horizontally disposed post 45. The opposite outer end 44b of the clock spring 44 engages a horizontally disposed post 37 secured to the substantially rigid link arm member 80. The clock spring 44 biases the seatback member 50 away from its generally upright occupiable configuration, as can be best seen in FIG. 4, so as to help the seatback member 50 initially move rearwardly, as indicated by arrow "FJ" in FIG. 5.

Reference will now be made to FIGS. 1 through 8, and mostly to FIGS. 4 through 8, which show the seatback member 50 being moved from its generally upright occupiable configuration, as can be seen in FIGS. 1A and 2 through 4, to its substantially horizontal load supporting configuration, as can be seen in FIGS. 1B and 8. As indicated by arrow "H" in FIGS. 3B and 4, one or both of the track release handles 38a are manually manipulated upwardly. Resultingly, the pivotally mounted latch members 70 are moved, as indicated by arrow "G" in FIG. 3B, from their locked configuration, as is best seen in FIG. 3B, to their unlocked configuration, as best seen in FIG. 4. Once the latch members 70 are moved to their unlocked configuration, the seatback member 50 can be manually grasped adjacent its lower extent and manually moved rearwardly, as indicated by arrow "I" in FIG. 4, against the biasing of the clock springs 44. During rearward movement of the seatback member 50 from its generally upright occupiable configuration to its substantially horizontal load supporting configuration, the weight of the seatback member 50 is supported by the first 91 and second 92 roller members. The link arm member 80 essentially tethers the seatback member 50 so as to preclude it from simply falling rearwardly, and subsequently causes the seatback member 50 to fold forwardly. As the seatback member 50 folds forwardly, it pivots about the seatback pivot axis "SP" that is concurrent with the axis of rotation "R" of the first 91 and second 92 roller members.

Figure 5:
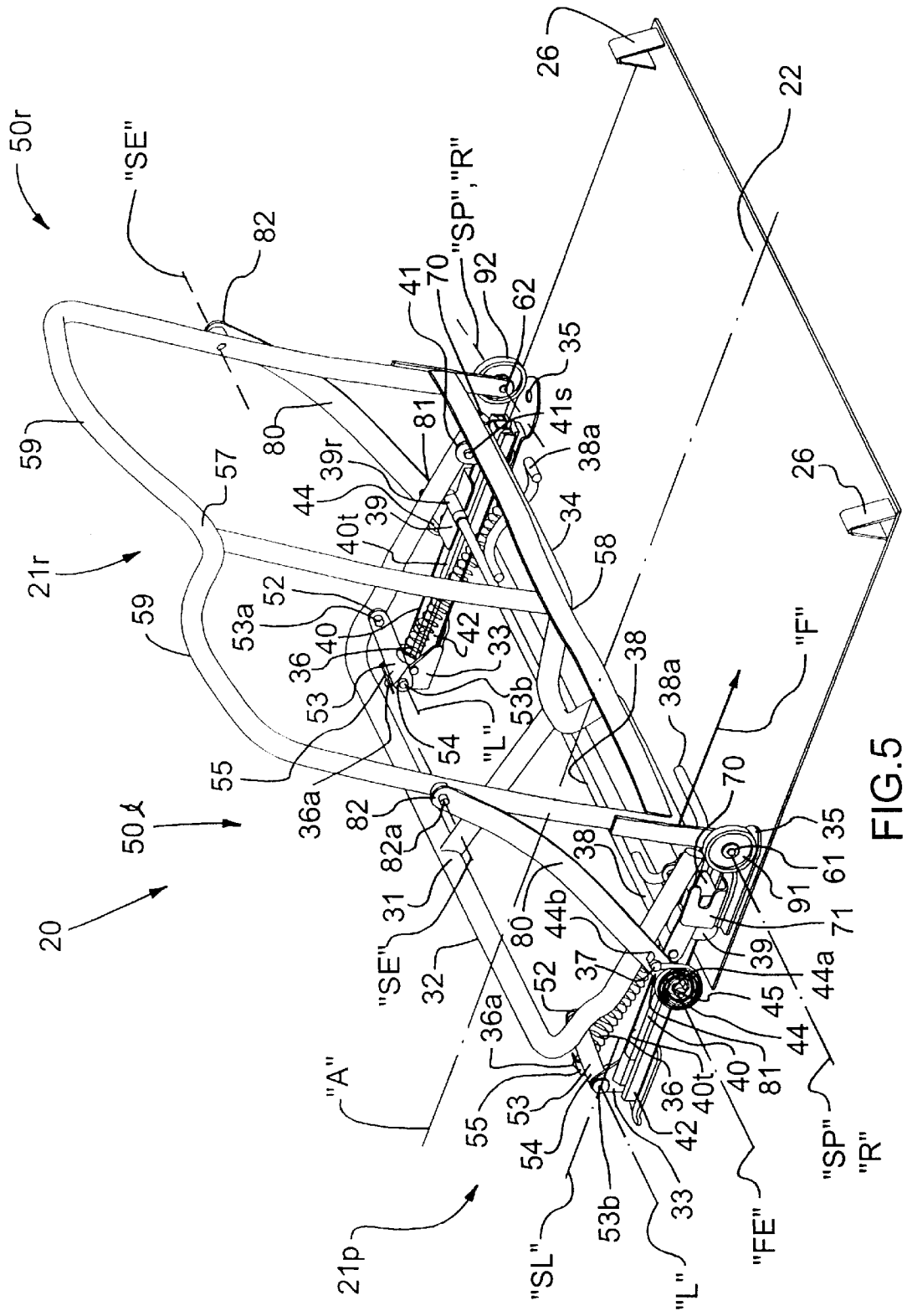
FIG. 5 is a perspective view similar to FIG. 4, but with the seat latch having been released and with the lower extent of the seatback member having moved slightly rearwardly and with the upper extent of the seatback member having moved very slightly forwardly.

The lower extent 58 of the seatback member 50 continues to be manually moved rearwardly, as indicated by arrow "F" in FIG. 5, through the generally vertical configuration shown in FIG. 5, which is essentially an "at-the-centre" configuration. Once the seatback member 50 folds forwardly past this "at-the-centre" configuration, the seatback pivot axis "SP" is disposed rearwardly of the second end pivot axis "SE", which allows the force of gravity to help move the seatback member 50 to its substantially horizontal load supporting configuration. Shortly thereafter, the biasing action of the clock springs 44 also tends to move the seatback member 50 rearwardly.

Figure 6:
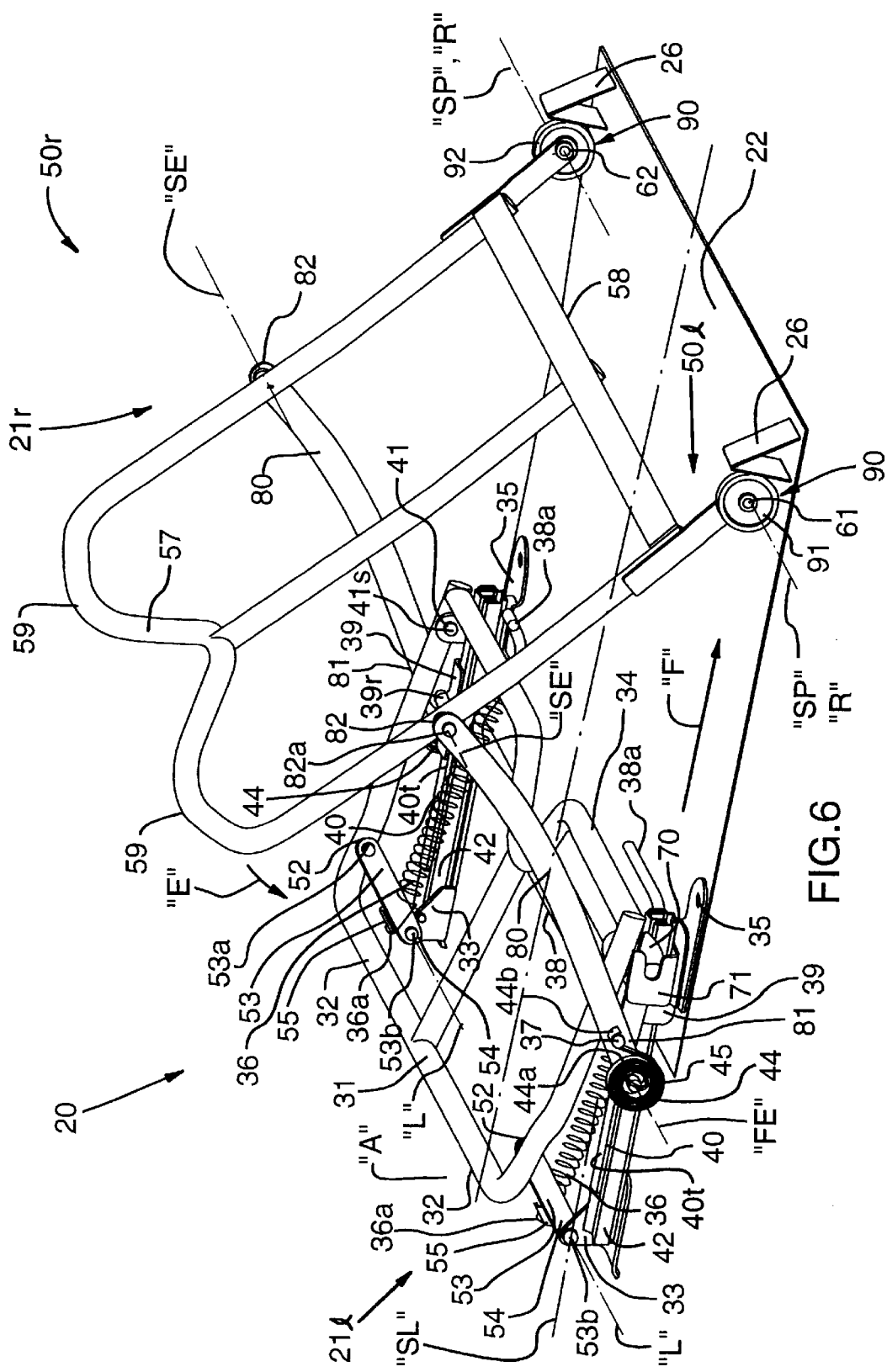
FIG. 6 is a perspective view similar to FIG. 5, with the seatback member having moved to a partially forwardly folded position with the roller members mounted on the lower extent of the seatback member contacting a stop disposed on the floor of the vehicle and with the upper extent of the seatback member continuing to move forwardly and downwardly.

As the seatback member 50 continues to fold forwardly from its generally upright occupiable configuration to its substantially horizontal load supporting configuration, the link arm member 80 causes the upper extent 59 of the seatback member 50 to move forwardly and downwardly, as indicated by arrow "E" in FIG. 6, and with the lower extent 58 of the seatback member 50 moving rearwardly, as indicated by arrow "F" in FIG. 6, a portion of the seatback member 50 adjacent its lower extent 58, namely the first 91 and second 92 roller members abut against the stop means 26 adjacent the back door 28 of the vehicle 24. The stop means 26 precludes further rearward motion of the first 91 and second 92 roller members. However, the upper extent 59 of the seatback member 50 still continues to move forwardly and downwardly, as indicated by arrow "J" in FIG. 7, as caused by gravity and the clock springs 44 as the seatback member 50 folds forwardly. Accordingly, the forwardly and downwardly directed movement of the upper extent 59 of the seatback member 50 causes the substantially rigid link arm members 80 to push forwardly on the moveable track members 40, so as to cause the moveable track members 40 to slide forwardly along the fixed track members 42 from a position as seen in FIG. 6, through a position as seen in FIG. 7, and ultimately to a forward position as seen in FIG. 8. Concurrently, the seat cushion member 30 is correspondingly caused, through the link arm member 80, to move from its initial raised rearward position, as can be best seen in FIG. 6, through an even more raised intermediate position as illustrated in FIG. 7, whereat the leg members 53 are substantially vertical, to the lowered forward position of the seat cushion member 30, as is illustrated in FIG. 8, whereat the leg members 53 are substantially horizontally disposed. As indicated by dashed line "AP" in FIG. 7, the upper leg ends 52 of the leg members 53 travel in an arcuate path and end up being substantially horizontal with the lower leg end 54 of the leg member 53, as can be best seen in FIG. 8.

It can therefore be readily seen that the substantially rigid link arm 80 is operatively interconnected, as discussed above, between the seatback member 50 and the seat cushion member 30 for controlling movement of the seatback member 50 relative to the seat cushion member 30 between the generally upright occupiable configuration of the seatback member 50 and the substantially horizontal load supporting configuration of the seatback member 50, when the pivotally mounted latch member 70 is in its unlocked configuration, or in other words when the first 61 and second 62 axle shafts are released.

The seat cushion member 30 is mountable, as aforesaid, by means of the movable track member 40 slideably engaging the fixed track member 42, for movement of the seat cushion member 30 from an initial rearward position coincident with the generally upright occupiable position of the seatback member 50 to a forward position coincident with the substantially horizontal load supporting position of the seatback member 50.

As illustrated in FIG. 8, the seatback member 50 has reached its substantially horizontal load supporting configuration in which the loadable back surface 56 is positioned in generally horizontal, upwardly facing relation, and the seatback member 50 is disposed directly over the floor 22 of the vehicle 24, with the upholstered front surface of the seatback member 50 is facing the floor 22, without the seat cushion member 30 in interposed relation. It is possible, depending on the exact shape of the upper extent 59 of the seatback member 50 and the exact shape of the rearward extent 34 of the seat cushion member 30, for a portion of the upper extend 59 of the seatback member 50 to overlap a portion of the rearward extent 34 of the seat cushion member 30, with the seatback member 50 still being disposed directly over the floor 22 of the vehicle 24.

Other modifications and alterations may be used in the design and manufacture of the vehicle seat assembly according to the present invention without departing from the spirit and scope of the accompanying claims. For example, although the vehicle seat assembly 20 is shown and discussed as a third row vehicle seat, it could be readily adapted with little or no significant modification, to be utilized in a vehicle as a first row vehicle seat or as a second row vehicle seat.

I claim:

1. A vehicle seat assembly for installation on a floor of a vehicle having a longitudinal axis, said floor having a stop means positioned behind the seat assembly when so installed, said seat assembly comprising:

a seat cushion member mountable on the floor;

a seatback member having inboard and outboard sides, a loadable back surface extending between a lower extent and an upper extent, and at least one lockable member mounted on the seatback member adjacent said lower extent thereof;

said seatback member being movable between a generally upright occupiable configuration in which said loadable back surface is positioned in a generally rearwardly facing, vertical orientation and said at least one lockable member is retained in closely held juxtaposed proximity to a rearward extent of the seat cushion member, and a substantially horizontal load supporting configuration which said loadable back surface is positioned in a generally horizontal, upwardly facing relation and said at least one lockable member is rearwardly displaced from said closely held juxtaposed proximity;

a locking means operatively mounted on the seat cushion member and adapted to be selectively movable between a locked configuration whereat said at least one lockable member is retained by said locking means in said closely held juxtaposed proximity, and an unlocked configuration wherein said at least one lockable member is released by said locking means from said closely held juxtaposed proximity;

a link means operatively interconnected between said seatback member and said seat cushion member for controlling movement of the seatback member relative to the seat cushion member between said generally upright occupiable configuration and said substantially horizontal load supporting configuration when said locking means is in said unlocked configuration; and, roller means operatively mounted on said seatback member adjacent said lower extent for supporting said seatback member in rolling relation as it moves between said generally upright occupiable configuration and said substantially horizontal load supporting configuration.

2. The vehicle seat of claim 1, wherein said link means comprises a link arm member pivotally mounted adjacent a first end thereof to said seat cushion member for rotation about a first end pivot axis and is pivotally mounted adjacent an opposite second end thereof to the seatback member for rotation about a second end pivot axis at a position spaced above the vertical level of said at least one lockable member.

3. The vehicle seat assembly of claim 2, wherein said seatback member folds forwardly when moving from said generally upright occupiable configuration to said substantially horizontal load supporting configuration such that said upper extent of said seatback member moves forwardly and downwardly and said lower extent of said seatback member moves generally rearwardly.

4. The vehicle seat of claim 3, wherein said seatback member folds forwardly about a seatback pivot axis common with the axis of rotation of said roller means.

5. The vehicle seat of claim 4, wherein said seat cushion member additionally comprises a movable track member, and said seat cushion member is mountable on the floor of said vehicle for longitudinal movement with respect to the floor of said vehicle by means of said movable track member slidably engaging a fixed track member, which fixed track member is rigidly mounted on the floor of said vehicle, for movement of said seat cushion member from an initial rearward position coincident with said generally upright occupiable configuration of said seatback member to a forward position coincident with said substantially horizontal load supporting configuration of said seatback member.

6. The vehicle seat of claim 5, wherein, as said seatback member is forwardly folded from said generally upright occupiable configuration to said substantially horizontal load supporting configuration, a portion of said seatback member adjacent said lower extent abuts against said stop means, so as to cause, through said link arm member, said corresponding movement of said seat cushion member from said initial rearward position to said forward position.

7. The vehicle seat of claim 6, wherein said link arm member is connected at its first end to said movable track member.

8. The vehicle seat of claim 7, wherein said seat cushion member is mountable on the floor of said vehicle by means of leg members pivotally connected at a lower leg end to the floor of said vehicle for pivotal movement about a lower fixed pivot axis, and pivotally connected at an opposite more upper leg end to said seat cushion adjacent a forward extent thereof, for pivotal movement about an upper movable pivot axis, such that said initial rearward position is a raised initial rearward position of said seat cushion member and said forward position is a lowered forward position.

9. The vehicle seat of claim 8, wherein said upper movable pivot axis is disposed rearwardly of said lower fixed pivot axis when said seat cushion member is in said raised initial rearward position and forwardly of said lower fixed pivot axis when said seat cushion member is in said lowered forward position, such that said forward extent of said seat cushion member is caused to move upwardly and then downwardly in an arcuate path when said seatback member moves from said raised initial rearward position to said lowered forward position.

10. The vehicle seat of claim 9, wherein said movable track member is pivotally affixed to said seat cushion member adjacent said rearward extent of said seat cushion member, for pivotal movement of said seat cushion member about a laterally disposed substantially horizontal seat cushion pivot axis, thereby providing for said upward and downward movement of the seat cushion member in an arcuate path of said forward extent of said seat cushion member.

11. The vehicle seat of claim 10, wherein, when said upper movable pivot axis is disposed above a straight line passing through said lower fixed pivot axis and parallel to the line of action of a first spring means operatively interconnected between said leg members and the floor of said vehicle, said seat cushion member is biased to said initial position by said first spring means.

12. The vehicle seat of claim 11, wherein, when said upper movable pivot axis is disposed below a straight line passing through said lower fixed pivot axis and parallel to the line of action of said first spring means, said seat cushion member is biased to said lowered forward position by said first spring means.

13. The vehicle seat of claim 12, wherein said link arm member is pivotally mounted adjacent its second end to said seatback member in a vertically central region of said seat back member.

14. The vehicle seat of claim 4, wherein said at least one lockable member comprises at least one axle shaft mounted on said seatback member in laterally extending relation adjacent said lower extent, and wherein said roller means comprises at least one roller member freely rotatably mounted on a respective axle shaft for rotation about said seatback pivot axis.

15. The vehicle seat of claim 14, wherein said at least one axle shaft comprises first and second axle shafts and said at least one roller member comprises first and second roller. members, with each roller member being freely rotatably mounted on said first and second axle shafts, respectively.

16. The vehicle seat of claim 15, wherein said first and second axle shafts are disposed adjacent the inboard and outboard sides, respectively, of said seatback member.

17. The vehicle seat of claim 16, wherein said first and second roller members are mounted on said first or second axle shafts, for operative rolling contact with the floor of said vehicle.

18. The vehicle seat of claim 14, wherein said link arm member is substantially rigid.

19. The vehicle seat of claim 1, wherein said seatback member is disposed directly over the floor of said vehicle and substantially rearwardly of said rearward extent of said seat cushion member when said seatback member is disposed in said substantially horizontal load supporting position.

20. The vehicle seat of claim 4, wherein, when said seatback member is in said generally upright occupiable configuration, said seatback pivot axis is disposed forwardly of said second end pivot axis, and, when said seatback member is in said substantially horizontal load supporting configuration, said seatback pivot axis is disposed rearwardly of said second end pivot axis.

21. The vehicle seat of claim 1, wherein said locking means comprises a pivotally mounted latch member.

22. The vehicle seat of claim 14, wherein said locking means comprises a pivotally mounted latch member.

* * * * *